T. E. MURRAY, Jr., AND J. B. MURRAY.
METHOD OF CONTROLLING ELECTRIC WELDING MACHINES.
APPLICATION FILED APR. 10, 1919.
1,320,896.
Patented Nov. 4, 1919.
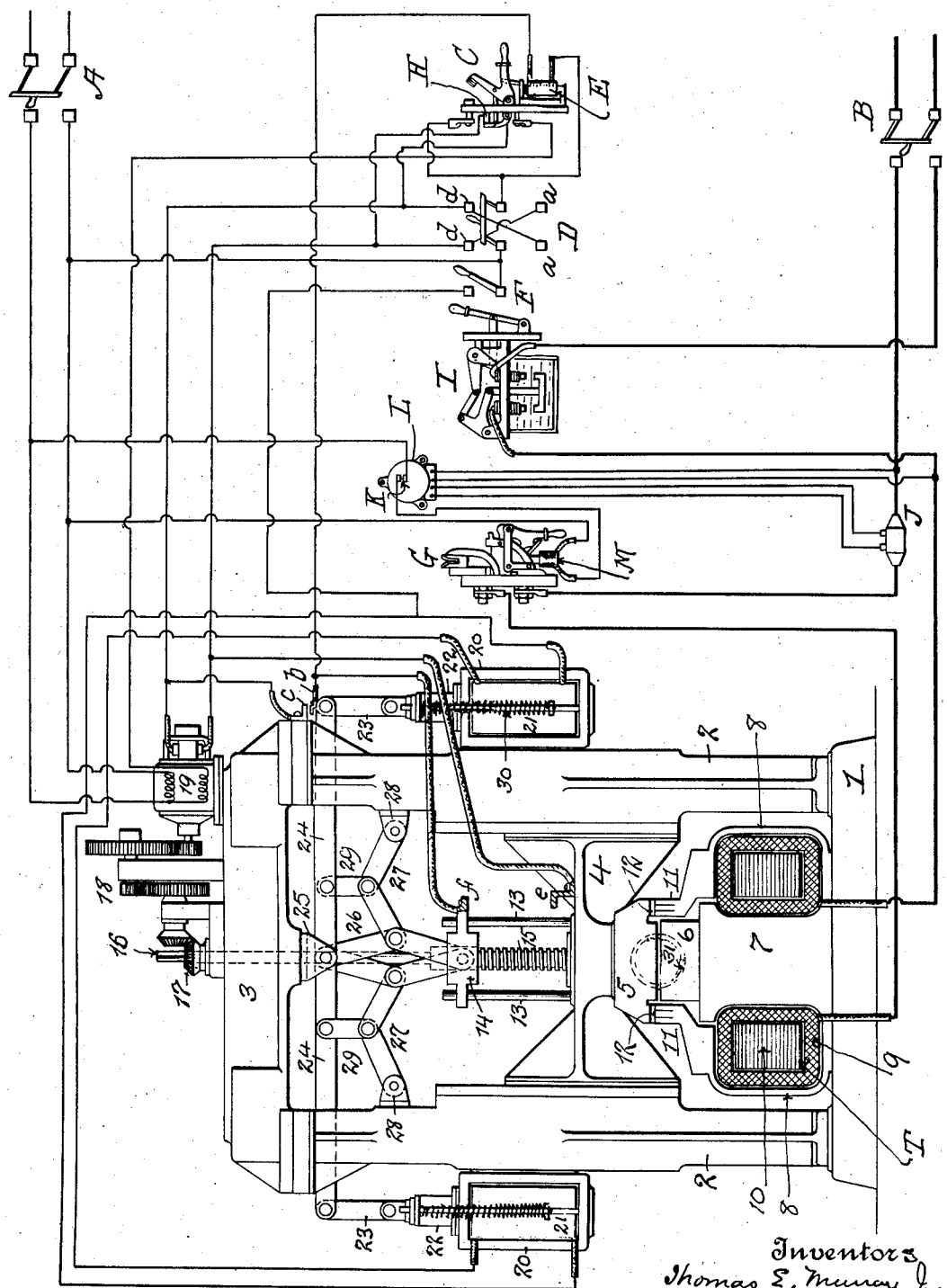

UNITED STATES PATENT OFFICE.

THOMAS E. MURRAY, JR., AND JOSEPH B. MURRAY, OF BROOKLYN, NEW YORK.

METHOD OF CONTROLLING ELECTRIC WELDING-MACHINES.

1,320,896.  Specification of Letters Patent.  Patented Nov. 4, 1919.

Application filed April 10, 1919. Serial No. 288,917.

*To all whom it may concern:*

Be it known that we, THOMAS E. MURRAY, Jr., and JOSEPH B. MURRAY, citizens of the United States, residing at Brooklyn, in the county of Kings and State of New York, have invented a certain new and useful Improvement in Methods of Controlling Electric Welding-Machines, of which the following is a specification.

The invention is a method of controlling electric welding machines, and more especially those in which welding currents of abnormally high ampere strength are used, such as set forth in U. S. Letters Patent Nos. 1,281,636 and 1,281,637, granted to Thomas E. Murray, Jr., one of the applicants herein, October 15, 1918. The invention has for its object the prevention of injury to the switch mechanism, whereby the welding current is controlled.

The accompanying drawing shows a front elevation of our welding machine connected in circuit with the controlling devices, hereinafter described.

The welding machine is constructed as follows:

Upon the bed 1 are upright standards 2 united at their upper ends by cross girder 3. On the inner sides of said standards are ways in which slide the cross head 4, which carries the upper electrode 5. The lower and coöperating electrode 6 is supported upon a pillar 7 which rests upon the bed 1, integral with which pillar and extending from the lower portion of the sides thereof are arms 8 which are turned upwardly and then inwardly to form loops in which are disposed the primary coil 9 of a transformer T, the core 10 of said transformer being received within said coil. The pillar 7 and arms 8 form the secondary of said transformer. Upon the upper ends of arms 8 are contacts 11 which, when the upper electrode 5 is in lowered welding position, coöperate with contacts 12 on said electrode 5, the secondary circuit then including the pillar 7, arms 8, the electrodes 5, 6 and the objects to be welded which are respectively disposed in conformably shaped recesses in the opposing faces of said electrodes.

Upon the upper side of the sliding cross head 4 are vertical guide rods 13, upon which slide a nut 14 which receives a vertical screw 15 rotatably stepped on said cross head. On said screw is a vertical shaft 16 which passes through girder 3 and above said girder is keyed to a bevel pinion 17 actuated by gearing 18 supported in standards on said girder and driven by an electric motor 19, also supported on said girder.

Secured on the outer sides of standards 2 are frames 20 in which are disposed electro-magnets 21, each having a plunger armature 22, which armatures at their upper ends are connected by links 23 to the outer ends of levers 24, which levers pass through standards 2 and at their inner ends are pivoted to a bracket 25 depending from girder 3. To said bracket are also pivoted the pairs of toggles 26 which at their lower ends are pivoted to nut 14. To the knuckle joints of toggles 26 are pivoted toggles 27, the outer ends of said toggles being pivoted in brackets 28 on the inner sides of standards 2. The knuckle joints of toggles 27 are connected by links 29 to the levers 24.

The switch A controls direct current and the switch B alternating current from suitable sources.

C is a limit switch and D the motor control switch. The switches A, B and C are first closed, and the motor control switch D is swung downwardly to close circuit with two contacts $a$, $a$.

The result is as follows: The motor 19 is set in operation to rotate the screw 15. The weight of the magnet armatures 22 and the levers and toggles connected thereto is to be sufficient to hold the nut 14 stationary, so that the effect of rotating the screw is to move the cross head 4 downwardly, thus clamping the objects to be welded between the electrodes 5, 6, and closing circuit through the contacts at 11, 12.

When, however, the objects become clamped between the electrodes and the further downward movement of the cross head 4 is stopped, the nut 14 will descend for a short distance on the screw 15 and the effect of this motion, multiplied by the toggles and levers, is to raise mechanically the plunger armatures 22 of electro-magnets 21, until the circuit is closed between a contact $b$ on one of the levers 24 and a fixed contact $c$ on one of the standards 2. By reason of this closure, a trip coil E on the limit switch C is excited, and the switch lever being drawn down opens said limit switch and stops the motor 19. At the same time, the opening of switch C closes contacts H on the back of said switch which short circuits the rotor of motor 19, causing said rotor instantly to stop.

Conditions are now prepared for the admission of the alternating current to the welding electrodes and for energizing the electro-magnets 21 so as to cause them to press said electrodes together. The magnet pressure is effected by closing a switch F, which establishes direct current to the coils of both magnets. To start the weld, a switch G, the contacts of which are in air, is first closed, and then the switch I, the contacts of which are in oil. The contacts of said switches are in series with the electrodes and with the alternating current circuit including switch B. When the proper amount of energy has been consumed in the weld, the current from a current transformer J in said alternating current circuit will cause the contacts K in the wattmeter relay L to close, thus exciting a trip coil M in the switch G, which opens said switch and interrupts the welding current. The construction and mode of operation of said wattmeter relay is fully set forth in U. S. Letters Patent No. 1,230,357, granted to Harry R. Woodrow June 19, 1917, and is, therefore, not detailed here.

The pressure switch F is then opened, the limit switch C closed and the motor control switch D is swung upwardly to close the contacts at $d$, $d$. This will result in the motor 19, assisted by the retracting springs 30 on magnets 22, raising the cross head 4 until circuit is closed between a contact $e$ on said head and a contact $f$ on the nut 14. The trip coil E of the limit switch C will thus be energized to open said switch C, thus stopping the motor 19. The welded work may then be removed from the electrodes, and after the oil switch I is closed and a new pair of objects to be welded are inserted in place between the electrodes, the cycle of operations is repeated.

Particular attention is called to the interposition of both the switches G and I in the welding circuit and the order in which they are operated by the attendant.

In a switch having its contacts in air, the closing of the circuit through said contacts under heavy load is liable to cause destruction of or injury to the contacts, while the opening of the circuit is not attended with similar results. On the other hand, in a switch having its contacts immersed in oil, the reverse conditions obtain. In accordance with our method, we first close the switch G which is under no load because the oil switch I is open, and, therefore, no trouble can result. And we then close the oil switch I, the contacts of which, as above noted, are not endangered by said closing. When the operation is completed, we open the switch G first—which is safe—and then open the switch I under the resulting condition of no load.

The foregoing method is at the present time in actual use making ogival pointed shells for the United States Government, which shells are stamped or pressed from sheet steel in two longitudinal half sections. Said sections are disposed with their longitudinal edges in registering contact and seated in the recesses in the electrodes, as indicated by dotted lines at 31. Said shells are about thirty inches in length by nine and a half inches in diameter, and the welding current used has an E. M. F. of 350 volts and a strength of 15,000 amperes.

We claim:

1. The method of controlling a welding current in a circuit including in series welding electrodes, a switch having its contacts in air and a switch having its contacts in oil in order to establish circuit to said electrodes, which consists in first closing said first-named switch and then closing said last-named switch.

2. The method of controlling a welding current in a circuit including in series welding electrodes, a switch having its contacts in air and a switch having its contacts in oil in order to open circuit to said electrodes, which consists in first opening said first-named switch and then opening said last-named switch.

In testimony whereof we have affixed our signatures in presence of two witnesses.

THOMAS E. MURRAY, Jr.
JOSEPH B. MURRAY.

Witnesses:
GERTRUDE T. PORTER,
MAY T. McGARRY.